United States Patent [19]

Blount

[11] Patent Number: 4,824,807

[45] Date of Patent: Apr. 25, 1989

[54] FLEXIBLE ALKALI METAL SILICATE GLASS PRODUCTS

[76] Inventor: David H. Blount, 6728 Del Cerro Blvd., San Diego, Calif. 92120

[21] Appl. No.: 57,810

[22] Filed: Jun. 1, 1987

[51] Int. Cl.⁴ .............................................. C03C 3/04
[52] U.S. Cl. .................................. 501/53; 23/313 AS; 65/18.1; 65/18.3; 65/18.4; 65/900; 423/332; 423/334
[58] Field of Search ...................... 65/18.1, 18.3, 18.4, 65/30.1, 111, 900, 901, 30.12; 428/149, 404, 426, 446; 423/332, 333, 334; 23/313 AS; 501/53

[56] References Cited

U.S. PATENT DOCUMENTS

| | | | |
|---|---|---|---|
| 3,948,629 | 4/1976 | Bartholomew et al. | 65/30.12 |
| 4,017,289 | 4/1977 | Hoda | 65/30.13 |
| 4,059,425 | 11/1977 | Brydges et al. | 65/30.12 X |
| 4,133,665 | 1/1979 | Bartholomew et al. | 64/30.12 X |
| 4,142,878 | 3/1979 | Olszewski et al. | 65/30.12 X |
| 4,239,519 | 12/1980 | Beall et al. | 65/30.13 |
| 4,442,175 | 4/1984 | Flannery et al. | 65/30.13 |
| 4,454,237 | 6/1984 | Hoda et al. | 65/33 |
| 4,472,185 | 9/1984 | Ulu | 65/30.13 |
| 4,622,657 | 11/1986 | Chyung et al. | 65/18.1 |

*Primary Examiner*—Robert L. Lindsay

[57] ABSTRACT

Alkali metal silicate glass is mixed with water to form an aqueous alkali metal silicate glass suspension, then dried to form a flexible solid alkali metal silicate glass product which may be heated to above the boiling temperature of water to produce a cellular product. The flexible solid product may be utilized as a flexible film, as an adhesive, a coating agent and a binding agent. The foamed product may be used for thermal and sound insulation.

8 Claims, No Drawings

FLEXIBLE ALKALI METAL SILICATE GLASS PRODUCTS

BACKGROUND OF THE INVENTION

This invention relates to a process for the production of flexible glass which has good strength, elasticity, wear resistance, thermostability, and will not support a flame. The glass may be produced as a solid or as a foamed product and utilized as flexible glass films, as coating agents, as adhesives, as binders, for molding useful products and as foam insulation.

It is well known in the arts that aqueous alkali metal silicates may be utilized as binders, adhesives, coating agents and films, but that it has many disadvantages because the products produced are very brittle and have poor strength properties. The novel products produced by the process of this invention are flexible, somewhat elastic and have good strength properties. It is known in the arts that the products produced from alkali metal silicate solution may be improved by the addition of polysilicate ions, but even with the addition of polysilicate ions, the products are still very brittle and are easily broken. On pages 122 and 123 of "The Chemistry of Silica" by Ralph K. Iler, published in 1979 by A. Wiley-Interscience publication, New York, Iler discusses sodium silicate solutions used as adhesive and points out that the film formed by drying the water from the film of sodium silicate produces a film which is brittle and has micro-cracks that lower the strength of the dried film.

In the known processes to produce adhesive films, alkali metal silicate glass is made water soluble by utilizing boiling water or steam to break down the particles or large molecules of alkali metal silicates into smaller molecules which are water soluble. These smaller molecules of alkali metal silicates produce brittle films when dried. In the process of this invention, the particles or large molecules of alkali metal silicates are not broken down into small molecules, thereby producing strong, flexible films upon drying.

I have discovered that a strong, flexible glass product can be produced by mixing a powdered alkali metal silicate glass with an $SiO_2$:alkali metal oxide in a ratio of 2.0:1 to 3.9:1, preferable 2.0:1 to 3.2:1, and water forms an aqueous alkali metal silicate glass suspension. Then the suspension is dried to produce the flexible glass. 10 to 80 parts by weight of the alkali metal silicate glass are mixed with 50 to 100 parts by weight of water. The $SiO_2$:alkali metal oxide ratio of the aqueous alkali metal silicate glass suspension may be increased up to about 25:1 by the addition of oxidated silicon compounds such as hydrated silica, aqueous suspended silica, precipitated silica, fumed silica, silicic acid, polysilicic acid, etc. The amount of oxidated silicon compounds used is limited by the amount of water present.

SUMMARY OF THE INVENTION

The alkali metal silicate glass utilized in this invention to produce aqueous alkali metal silicate glass suspension may be produced by any of the known methods such as fusing silica with alkali metal carbonates, alkali metal oxides, alkali metal hydroxides and/or alkali metal sulfates in the presence of carbon. The fused alkali metal silicate glass is preferred to be in a powdered form.

The aqueous alkali metal silicate glass suspension may be produced in any suitable manner and under any suitable physical condition, but it is necessary to avoid breaking down all of the large alkali metal silicate glass particles or molecules into smaller water-soluble molecules. The aqueous alkali metal silicate glass suspension may be produced by mixing alkali metal silicate glass and water, or directly from silica, sodium hydroxide or sodium oxide and water in an autoclave by utilizing heat and pressure.

The alkali metal silicate glass is a mixture of alkali metal polysilicates with the molecules of alkali metal polysilicates containing various amounts of alkali metal oxide radicals, thereby making a small portion of the alkali metal silicate glass readily soluble in water. The remaining portion is slow to dissolve enough to form a suspension. Part of the suspended particles will gradually settle out of the water.

The components, alkali metal compounds, silica and water, may be mixed and reacted in any suitable manner, under any suitable physical condition, utilizing heat and at ambient or elevated pressures. The alkali metal compounds and silica may be first reacted to produce an alkali metal silicate glass, then mixed with water to form an aqueous suspension, or the components may be added to an autoclave simultaneously and reacted to form an aqueous suspension.

The aqueous alkali metal silicate glass suspension may also be produced directly by heating hydrated silica and/or microcrystalline silica, strong alkali metal hydroxide or oxide and water in an autoclave, but the heating must be stopped before the larger molecules of alkali metal polysilicate glass are broken down into water-soluble smaller molecules of alkali metal silicates. Production time greatly varies, depending on the temperature, pressure and concentration of the alkali metal oxide radical. An $SiO_2$:NaO ratio as high as 3.25:1 may be produced by this autoclave method.

The preferred process to produce aqueous alkali metal silicate glass suspension is to mix and agitate 10 to 80 parts by weight of powdered alkali metal silicate glass, having an $SiO_2$:alkali metal oxide ratio of 3.9:1 to 2:1 with 50 to 100 parts by weight of water. The mixing may take place at ambient temperature and pressure, or be mixed in boiling water for up to 30 minutes. It is necessary to avoid breaking down all the large alkali metal silicate glass molecules into small water-soluble molecules by heating the mixture for too long a period of time at elevated temperatures and pressure. The alkali metal silicate glass having a lower ratio of $SiO_2$:alkali metal oxide such as 2:1 will form a suspension more readily than those with higher ratios such as 3.2:1 at ambient temperature and pressure. Only a small portion of the alkali metal silicate glass with high ratios of $SiO_2$ is soluble in water and it takes several days at ambient temperature to form an aqueous alkali metal silicate suspension. The mixture at first is white in color, then gradually clears, but remains somewhat opaque.

The physical properties of the aqueous alkali metal silicate glass suspension are greatly different from the physical properties of the alkali metal silicate solutions as now known in the arts. When an aqueous sodium silicate glass suspension, as produced by the process of this invention, is compared to an aqueous sodium silicate solution with the same $SiO_2$:NaO and concentration such as an $SiO_2$:NaO ratio of 3.25, there is a great difference in the type of organic and inorganic compounds that can be mixed with these products without causing coagulation or gel formation. Many compounds such as alcohols, polyols, substituted organic compounds, polyesters, urea, formaldehyde, amines, organic oxides, epoxies, etc., will cause the known aqueous sodium silicate solution to precipitate, coagulate or gel when mixed together, whereas the novel aqueous sodium silicate glass suspension is not affected by mixing with these compounds. There is also a much slower reaction to weak acids, such as $CO_2$ in water, on the glass suspension. Atmospheric $CO_2$ is very slow to affect the superficial layer of the glass suspension and after drying, the film has remained flexible for months, whereas aqueous sodium silicate solutions are rapidly affected by $CO_2$.

A comparison study was done, utilizing a commercial available aqueous sodium silicate solution with an $SiO_2$:NaO ratio of 3.25:1 and containing about 37% solids and an aqueous sodium silicate glass suspension produced by the process of this invention with the same $SiO_2$:NaO ratio and concentration. An equal amount of each was poured on glass to produce a uniform thin film. These films were dried under the same ambient temperature and pressure at the same time. The dried commercial sodium silicate film products produced were weak, brittle and cracked, whereas the novel sodium silicate glass film products produced were tough, somewhat elastic and flexible and have remained flexible for about a year. They continue to remain flexible.

Up to about 30 percent by weight of the known aqueous alkali metal silicate solution may be added to the novel aqueous alkali metal silicate glass suspension to increase the rapidity of drying and curing by the reaction of $CO_2$ with the alkali metal oxide ion without causing the dried film to be brittle. When over 30 percent by weight of the aqueous alkali metal silicate solution is added, the dried films start to become brittle.

The addition of a free-radical initiator, such as organic and inorganic peroxides, alkali metal persulfates, ammonium persulfate and mixtures thereof, enhances the reaction of the silanol and/or silicic acid groups with each other in the drying process. Promotors and initiators of the free-radical initiator may also be used.

The alkali metal silicate glass products may be modified or reacted with by many organic and inorganic compounds, up to 300 percent by weight, based on weight of the aqueous alkali metal silicate glass suspension, may be added to the suspension. Fillers, inorganic and/or organic, and strengthening elements, whether in the form of inorganic and/or organic products such as wires, fibers, webs, foams, woven fabric, skeletons, etc., may be added to the suspension in an amount up to 300 percent by weight, based on weight of the aqueous alkali metal silicate glass suspension. When there is a high alkali metal oxide content in the aqueous suspension, acid-liberating hardeners and salt-forming compounds may be added to the suspension to react with the alkali metal oxide groups to form salt. The dried, flexible alkali metal silicate glass produced may be placed in an atmosphere of $CO_2$ to assist in the curing of the product.

The alkali metal silicate glass may be foamed by heating the aqueous alkali metal silicate glass suspension to above the boiling of water and the alkali metal silicate glass dries and expands into a cellular product. The aqueous alkali metal silicate glass suspension may be first dried, then heated to above the boiling temperature of water and the steam produced expands the alkali metal silicate glass into a rigid cellular product. Blowing agents, emulsifiers, cell regulators, foam stabilizers, inert fillers, modifying compounds, free-radical initiators and water-binding agents may be added to the aqueous alkali metal silicate glass suspension before foaming.

Additives may be added to emulsify the mixture, to modify the cells in the cellular solid, to regulate the foaming and to stabilize the cellular solid. The mixture may be emulsified with alkali soaps, metallic soaps such as zinc stearate and calcium stearates and detergents. The cells in the cellular solid may be modified, regulated and stabilized by the addition of additives such as metallic powders, ethyl cellulose, chlorinated natural rubber, polyvinyl acetate, polyvinylchlorides, metallic salts, metallic oxides and hydroxides, alkylated phenoxy compounds, polyethoxy ethanol, sodium dioctyl sulfosuccinate, dioctyl calcium sulfosuccinate, dioctyl sulfosuccinate, methyl morpholine, diethylethanolamine, polyether siloxanes, and mixtures thereof.

The novel solid and cellular products produced by this invention have many uses. The aqueous alkali metal silicate glass suspension may be sprayed by means of compressed air or by the airless spraying process onto surfaces. It forms a protective coating on wood, steel, iron, tin metal sheets, plastics, fabric, etc. It may be applied to these products by means of a brush, roller, or by dipping, to form a protective coating. This protective coating of flexible alkali metal silicate glass may be heated to above the boiling point of water and it expands from 3 to 5 times its original volume to form a protective and insulating coating. The aqueous alkali metal silicate glass suspension may be utilized as an adhesive by applying it between two pieces of paper, glass, fabric, wood, metal, plastics, etc., and then allowing the suspension to dry into a strong, flexible adhesive film. Reinforcing elements may be added to strengthen the coating and adhesive film. The aqueous alkali metal silicate glass suspension, optionally containing fillers, modifying compounds, free radical initiators, salt-forming compounds, reinforcing elements, coloring and any other desirable additive, may be poured into a mold, then dried into a solid alkali metal silicate glass product. The aqueous alkali metal silicate glass suspension may be poured into a mold, optionally containing fillers, blowing agents, foam stabilizers, emulsifiers, coloring agents, salt-forming compounds, reinforcing agents, modifying compounds, free radical initiators and any other desirable additive, then be heated so as to evaporate water until a solid is formed. Then it is heated to above the temperature of boiling water, thereby foaming it to produce a cellular rigid product which may be used as thermal and sound-insulation panels, packaging material, art objects, building material, light-weight blocks, catalyst carriers, door insulation panels, etc.

Any suitable organic or inorganic compound which reacts with the alkali metal oxide radical of the alkali metal silicate glass to produce a salt may be used in this invention to reduce the alkali metal oxide radical reacted with the silica, thereby making the flexible glass more water-resistant. The saltforming compounds which slowly react with the alkali metal silicate glass are preferred, e.g., alkaline earth metal salts, metal salts, organic-inorganic metal salts, organic esters, alkylating agents, etc.

Suitable salt-forming compounds may contain salt-forming groups, for example:

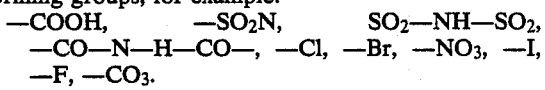

Two or more of the aforementioned groups can also be present. Suitable salt-forming compounds include, but are not limited to, mineral acids, hydrogen-containing salts of mineral acids, organic acid, polyfunctional alkylating agents, monofunctional alkylating agents, $CO_2$, halogens, alkaline earth metal inorganic salts, alkaline earth metal organic salts, metal inorganic salts and metal organic salts. Further examples of salt-forming compounds may be found in DAS No. 1,205,087; Dutch Auslegischrift No. 67/03743; German Pat. No. 1,178,586; and in U.S. Pat. No. 3,450,592. Various salt-forming compounds may also be used in combination.

Any suitable free-radical initiator which will promote the chemical reaction of an alkali oxidated silicon compound with another oxidated silicon compound, inorganic compound or organic compound may be used in this invention. Suitable free-radical initiators are inorganic and organic peroxides, alkali metal persulfates and mixtures thereof. The free-radical initiator can be modified by activators and promoters. Initiators are strong oxidizing agents and promoters that usually are strong reducing agents. Redox systems may also be utilized in this invention. The activators and promoters vary with each free radical initiator and are well known in the chemical arts. The organic peroxides are well known in the chemical arts.

The preferred free-radical initiators are inorganic peroxides.

Any suitable organic or inorganic compound that will react chemically with alkali oxidated silicon compound may be used to modify the alkali metal silicate glass products. Compounds which are polymerized by free-radical initiators may be used to modify the alkali metal silicate glass products Any suitable modifying or additive compounds may be used in the reaction of this invention to vary properties of the product. Typical modifying compounds include polyols, polyepoxides, polysulfide polymers, alkali sulfides, sodium polysulfides, aminoplasts, phenoplasts, fatty or rosin acids, furfural-ketone resins, styrene oxides, carbon disulfide, sulfur, wood flour, wood fibers, cellulose, lignin, polyester polymers, polyether polymers, vegetable oil, melamine, furan compounds, vinyl monomers and polymers, and copolymers, aliphatic diene polymers and copolymers, halogenated aliphatic and aromatic compounds, triallyl cyanurate, polyepichlorohydrin polymers, alkali metal phenols, alkali metal salts of dicarboxyl acids, alkali metal polyhydroxy aliphatic and aromatic compounds, alkali metal salts of poly(acrylic acid) polymers and poly(methacrylic acid) polymer, aldehydes and organic esters, phosphate polyols and mixtures thereof.

Various reinforcing agents may be used in this invention. The inorganic and/or organic reinforcing elements may be, e.g., fibers, metal wires, foams, fabrics, fleeces or skeletons. The reinforcing elements may be mixed with the reaction mixture, for example, by the fibrous web impregnation or by processes in which the reaction mixtures and reinforcing fibers are together applied to the molds, for example, by means of a spray apparatus. The shaped products obtained in this way may be used as building elements, e.g., in the form of sandwich elements, either as such or after they have been laminated with metal, glass, plastics, wood or concrete. If desired, these sandwich elements may be foamed. These products may be used as hollow bodies, e.g., as containers for goods which may be required to be moist or cool, as filter materials or exchanges, as catalyst carriers or as carriers of active substances, as decorative elements, furniture components and filling for cavities. They may be used in the field of model building and mold building, and in the production of molds for metal casting, which may also be considered.

Fillers in the form of powders, granules, wire, fibers, dumbbell-shaped particles, crystallites, spirals, rods, beads, hollow beads, foam particles, non-woven webs, pieces of woven or knitted fabrics, tapes and pieces of foil or solid inorganic or organic substances, e.g., dolomite, chalk, alumina, asbestos, basic silicic acids, sand, talc, iron oxide, aluminum oxide and hydroxide, calcium sulfates, alumino silicates, basalt wool or powder, glass fibers, carbon fibers, graphite, carbon black, Al, Fe, Cu and Ag powders, molybdenum sulfide, steel wool, bronze or copper meshes, silicon powder, expanded clay particles, hollow glass beads, glass powder, lava and pumice particles, wood chips, wood meal, cork, cotton, straw, popcorn, coke or particles of filled or unfilled, foamed or unfoamed, stretched or unstretched organic polymers, may be added to the mixture of the components in many applications. Among the numerous organic polymers which may be used, e.g., as powders, granules, foam particles, beads, hollow beads, foamable but not-yet-foamed particles, fibers, tapes, woven fabrics or fleeces, the following may be mentioned as examples: polystyrene, polyethylene, polypropylene, polyacrylonitrite, polybutadiene, polyisoprene, polytetrafluoroethylene, aliphatic and aromatic polyesters, melamine, phenoplasts, aminoplasts, polyacetal resins, polyepoxides, polyhydantoins; polyethers, polyurethane, polyimides, polyamides, polysulphones, polycarbonates and carbonates and mixtures thereof.

The composite materials of the invention may be mixed with considerable quantities of fillers without losing their advantageous properties and, in particular, composite materials which consist predominantly of organic constituents which are, preferably, filled with inorganic fillers, where silicate constituents predominate, it is preferably filled with organic fillers.

Blowing agents may be used in this invention. The blowing agents are usually inert liquids with boiling points ranging from $-25°$ C. to $100°$ C. The organic blowing agents may be, e.g., acetone, ethyl acetate, halogenated alkanes, e.g., methylene chloride, monofluorotrichloromethane, dichlorodifluoromethane, butane, hexane, heptane or diethylether. There are compounds which decompose at temperatures above room temperature with liberation of, e.g., nitrogen. Compressed air may also be used as the blowing agent.

The object of the present invention is to provide a novel process to produce a novel aqueous alkali metal silicate glass suspensions. Another object is to produce alkali metal silicate glass foam products. Still another object is to produce novel cellular and solid alkali metal silicate glass products which are relatively low in cost. Another object is to produce novel cellular products which are rigid, light-weight, have good strength, are flame-proof, with good resistance and dimentional stability when heated, and may be used for thermal or sound insulation, structural purposes, shock-resistant packaging such as a cavity filler and casting material. Another object is to produce novel aqueous alkali metal silicate glass suspension which may be utilized as a coating agent, as a binder, as an adhesive, as cast material, as mortor and as flexible films.

The ratio of the essential reactants and optional reactants which lead to aqueous alkali metal silicate glass suspensions, alkali metal silicate glass solids and foams produced in this invention may vary, broadly speaking, with ranges as follows:

Essential reactants
(a) 10 to 80 parts by weight of alkali metal silicate glass;
(b) 50 to 100 parts by weight of water;

Optional reactants
(c) up to 10 percent by weight of a free-radical initiator, based on weight of the aqueous alkali metal silicate glass suspension;
(d) up to 300 percent by weight of a modifying compound, based on weight of the aqueous alkali metal silicate glass suspension;
(e) up to 100 percent by weight of an oxidated silicon compound, based on the weight of the aqueous alkali metal silicate glass suspension;
(f) up to 300 percent by weight of an inert filler material, based on weight of the aqueous alkali metal silicate glass suspension;
(g) up to 20 percent by weight of a foam stabilizer, based on the weight of the aqueous alkali metal silicate glass suspension;
(h) up to 50 percent by weight of a chemically inert blowing agent, boiling within the range of from $-25°$ C. to $100°$ C., based on the weight of the aqueous alkali metal silicate glass suspension;
(i) up to 10 percent by weight of an emulsifier, based on the weight of the aqueous alkali metal silicate glass suspension;
(j) up to 10 percent by weight of an activator for the free-radical initiator, based on the weight of the aqueous alkali metal silicate glass suspension;
(k) up to 10 percent by weight of a promoter of the free-radical initiator, based on the weight of the aqueous alkali metal silicate glass suspension;
(l) up to 30 percent by weight of a salt-forming compound, based on the weight of the aqueous alkali metal silicate glass suspension.

DESCRIPTION OF PREFERRED EMBODIMENTS

My invention will be illustrated in greater detail by specific Examples, which follow, it being understood that these preferred embodiments are illustrative of, but not limited to, procedures which may be used in the production of flexible glass products. Parts and percentages are by weight unless otherwise indicated.

EXAMPLE 1

About 50 parts by weight of powdered sodium silicate glass with an $SiO_2:NaO$ ratio of 3.25 to 1 was mixed with 50 parts by weight of water and occasionally agitated to keep the particles suspended. After 2 days, the mixture contained a mixture of suspended glass particles and particles that settled to the bottom of the container. The mixture was agitated, then poured onto polyethylene dishes in the form of a thin layer, then placed in the sun. The film slowly dried over a period of 3 to 4 days and was removed from the dishes. The film was about 1 Mil. thick, was flexible, had some elasticity and had fair tear resistance. The glass film has remained flexible for from 4 to 5 months and is still flexible today. One of the air-dried films was heated in an oven at $200°$ F. for 2 hours and remained flexible, somewhat elastic, and continues to have fair tear resistance.

EXAMPLE 2

About 40 parts by weight of powdered sodium silicate glass, having an $SiO_2:NaO$ ratio of 3.25:1, and 60 parts by weight of water are mixed, then agitated while being heated to the boiling point for about 10 minutes. A mixture is produced wherein a small part of the glass is in solution, a greater part is suspended and a smaller part settles to the bottom of the container. The mixture is cooled, then poured into polyethylene plastic plates in a thin layer. The water is removed by drying with a blower with an air temperature of about $110°$ F. The mixture dries to form a thin, flexible film about 1 Mil. thick which is somewhat elastic and has good tear resistance. One of the films was further treated by being placed in an atmosphere of $CO_2$ for about 1 hour. The treated film remained strong and flexible.

EXAMPLE 3

Comparison studies were done by making thin layers of dried aqueous sodium silicate solution containing about 40 percent solid sodium silicate with an $SiO_2:NaO$ ratio of 3.25:1 which was produced commercially by the usual method known in the arts. These thin layers of aqueous sodium silicate were dried along with the layers of aqueous sodium silicate glass suspension as produced in Examples 1 and 2. The dried film of the solution was very brittle and had multiple small cracks whereas the film produced as in Examples 1 and 2 were flexible and had good tear resistance.

Pieces of cloth were coated with the aqueous sodium silicate solution as in Example 3; and others, with aqueous sodium silicate glass suspension as produced in Examples 1 and 2, then dried. The The coated cloths were examined and the pieces coated with the aqueous sodium silicate solution were stiff, and the coatings were very brittle and easily cracked, but the pieces coated with the aqueous sodium silicate glass suspension were flexible and the coating did not crack on flexing.

Pieces of heavy paper were adhered together by using a thin layer of the above-mentioned aqueous sodium silicate solution on some and the aqueous sodium silicate glass suspension, as produced in Examples 1 and 2, on other pieces of paper, then all were dried. The dried adhesive layer of the aqueous sodium silicate solution formed a good adhesive bond, but was very brittle and broke on flexing, whereas the dried adhesive layer produced from the aqueous sodium silicate glass suspension also produced a good adhesive bond, but the adhesive layer was flexible and did not break when flexed.

EXAMPLE 4

Example 1 is modified wherein the $SiO_2:NaO$ ratio is changed to 2.0:1.

EXAMPLE 5

Example 1 is modified wherein the $SiO_2:NaO$ ratio is changed to 2.5:1.

EXAMPLE 6

Example 1 is modified by adding 5 parts by weight of a polyol, selected from the list below, to the aqueous sodium silicate glass suspension, then drying, thereby producing a flexible alkali metal silicate glass product:
(a) glycerol;
(b) polypropylene triol (OH number 56);

(c) polypropylene triol (OH number 28);
(d) polyethylene diol;
(e) BISPHENOL A;
(f) phenol-formaldehyde resin with free OH groups;
(g) sucrose;
(h) dextrose.

EXAMPLE 7

Example 1 is modified by adding 5 parts by weight of a modifying compound, selected from the group listed below, to the aqueous sodium silicate glass suspension, then drying the suspension, thereby producing a flexible alkali metal silicate glass product:
(a) aminoplast;
(b) 3 parts by weight of urea and 2 parts by weight of aqueous formaldehyde solution;
(c) phenoplast;
(d) furfural-ketone resin;
(e) wood flower;
(f) wood fibers;
(g) cellulose;
(h) lignin;
(i) polyester resin;
(j) melamine;
(k) polystyrene aqueous emulsion;
(l) aqueous emulsion of polyvinylacetate;
(m) aqueous emulsion of sodium salt of adipic acid;
(n) sodium salt of poly(acrylic acid);
(o) aqueous emulsion of ethylene vinyl acetate copolymers;
(p) polyepoxy resin;
(q) polysulfide polymer;
(r) aqueous emulsion of poly(vinyl chloride) polymer;
(s) dimethyl methyl phosphate;
(t) polymeric diphenylmethane diisocyanate;
(u) aqueous solution of polyvinyl alcohol;
(v) aqueous solution of polyvinyl chloride;
(w) castor oil;
(x) mixture of the above.

EXAMPLE 8

Example 1 is modified by adding 5 parts by weight of an inorganic compound in a powder form to the sodium silicate glass suspension, then drying the suspension, thereby producing a flexible alkali metal silicate glass product:
(a) boron oxide;
(b) calcium hydroxide;
(c) lead oxide;
(d) arsenic oxide;
(e) aluminium oxide;
(f) magnesium oxide;
(g) calcium borate;
(h) titanium oxide;
(i) Barium oxide;
(j) Barium chloride;
(k) calcium carbonate;
(l) aluminium;
(m) zinc oxide;
(n) zeolite;
(o) tin oxide;
(p) manganese oxide;
(q) iron oxide;
(r) lead acetate;
(s) zinc sulfate;
(t) molybdenum sulfide;
(u) basalt;
(v) dolomite;
(w) copper;
(x) mixture of the above.

EXAMPLE 9

Example 2 is modified by adding 0.5 parts by weight of a radical initiator to the aqueous sodium silicate glass suspension of Example 2 and the suspension is dried, thereby producing a flexible alkali metal silicate glass product:
(a) hydrogen peroxide;
(b) potassium persulfate;
(c) benzyol peroxide with diethyl aniline;
(d) sodium persulfate;
(e) methyl ethyl ketone peroxide with cobalt naphthenate.

EXAMPLE 10

Example 1 is modified by using an alkali metal silicate glass powder, listed below, in place of the sodium silicate glass:
(a) potassium silicate glass with $SiO_2:KO$ ratio of 2.5:1;
(b) 10 parts by weight of lithium silicate glass of a $SiO_2:LiO$ ratio of 2.3:1.is used in place of 10 parts by weight of sodium silicate glass;
(c) 50 percent of the sodium silicate glass is replaced with potassium silicate glass with an $SiO_2:KO$ ratio of 2.3:1.

EXAMPLE 11

Example 1 is modified wherein the $SiO_2:NaO$ ratio is changed by adding 5 parts by weight of the following aqueous silicate to the aqueous sodium silicate glass suspension:
(a) sodium polysilicate with an $SiO_2$ NaO ratio of 20:1;
(b) sodium polysilicate with an $SiO_2:NaO$ ratio of 10:1;
(c) sodium hydroxide stabilized silica sol with an $SiO_2:NaO$ ratio of 10:1;
(d) potassium polysilicate with an $SiO_2:KO$ ratio of 11:1;
(e) colloidal silica;
(f) polysilicic acid gel;
(g) precipitaled silica;
(h) hydrated silica;
(i) mixtures of the above.

EXAMPLE 12

The process of claim 4 was modified to where the dried flexodium silicate glass films were placed in an atmosphere of carbon dioxide and remained flexible.

EXAMPLE 13

The process of claim 1 wherein a filler and/or a reinforcing agent was added in the amount of 15 parts by weight to the aqueous sodium silicate glass suspension:
(a) powdered silica;
(b) powdered talc;
(c) powdered Wallastonite;
(d) fiberglass powder;
(e) fiberglass cloth;
(f) wood fibers;
(g) Barium sulfate powder;
(h) carbon fibers;
(i) polyester fibers;
(j) polyimide fibers;
(k) polyamide fibers;

(l) polyethylene fibers;
(m) polypropylene fibers;
(n) fine steel fiber;
(o) acrylic fibers;
(p) expanded fine clay;
(q) expanded silica micropheres;
(r) chalk powder;
(s) dolomite powder;
(t) graphite;
(u) copper cloth;
(v) silicon powder;
(w) woven fabric;
(x) mixtures of the above.

EXAMPLE 14

Example 1 is modified by heating the flexible glass films to above the boiling temperature of water and the films slowly expand to from 3 to 5 times their original volume, thereby producing a rigid, fine cellular product.

EXAMPLE 15

About 100 parts by weight of the aqueous sodium silicate glass suspension, produced in Example 2, were placed in a telfa-lined mold, then air-dried at a temperature below the boiling point of water. After the sodium silicate glass became a solid, the temperature was elevated to above the boiling point of water and the sodium silicate glass slowly expanded to from 3 to 5 times its original volume to form a rigid cellular sodium silicate glass product.

EXAMPLE 16

About 100 parts by weight of the aqueous sodium silicate glass suspension were placed in a telfa-lined mold and 5 parts by weight of a filler, selected from the list below, were added to the suspension, then air-dried until it became a solid. This solid product was heated to above the boiling point of water and it slowly expanded to from 3 to 5 times its original volume to form a rigid cellular product:
(a) hollow silica micropheres;
(b) hollow polystyrene micropheres;
(c) silica powder;
(d) talc powder;
(e) Wollastonite powder;
(f) chalk powder;
(g) fine expanded clay;
(h) fiberglass powder;
(i) carbon fibers;
(j) hydrated silica powder;
(k) aqueous vinyl acetate solution;
(l) vinyl acetate-ethylene copolymer powder;
(m) vinyl alcohol powder;
(n) wood powder;
(o) aluminum oxide powder;
(p) zeolite powder;
(q) basalt wood;
(r) fine glass fiber;
(s) fine steel fibers;
(t) glass powder;
(u) phenoplast powder;
(v) urea-formaldehyde powder;
(w) polyester resin;
(x) lava powder;
(y) magnesium oxide powder;
(z) mixtures of the above.

EXAMPLE 17

Example 1 is modified by adding a compound which will react with the alkali metal oxide ion to raise the $SiO_2:NaO$ ratio to 4:1 and which is selected from the list below:
(a) acetic acid;
(b) acrylic acid;
(c) methacrylic acid;
(d) Barium sulfate;
(e) barium chloride;
(f) lead acetate;
(g) sodium hydrogen sulfate;
(h) boric acid;
(i) adipic acid;
(j) ammonia sulfate;
(k) maleic anhydride;
(l) calcium sulfate;
(m) calcium chloride;
(n) vinyl acetate;
(o) zinc sulfate;
(p) ammonium chloride;
(q) cupric sulfate;
(r) aluminum sulfate;
(s) Stannous chloride;
(t) nickel ammonium sulfate;
(u) cobalt sulfate;
(v) ferrous sulfate;
(w) silicon tetrachloride;
(x) calcium phosphate;
(y) calcium carbonate;
(z) mixtures of the above.

EXAMPLE 18

Example 2 is modified by adding 0.5 parts by weight of a free-radical initiator selected from the group consisting of organic peroxides, inorganic peroxides and alkali metal persulfate with their initiator, and then adding 5 parts by weight of a polymerizable organic compound, selected from the group below, to the aqueous alkali metal silicate glass suspension while agitating and optionally under pressure. Then when the organic compound is polymerized, the mixture is dried to produce a flexible solid alkali metal silicate glass product:
(a) styrene;
(b) vinyl acetate;
(c) methyl methyl acrylate;
(d) methyl acrylate;
(e) vinyl chloride;
(f) Butadiene;
(g) acrylonitrile;
(h) polyester resin;
(i) chloroprene;
(j) isoprene:
(k) vinylidene chloride;
(l) vinyl methyl ether;
(m) vinyl pyrrolidone;
(n) allyl phthalate;
(o) ethyl acrylate;
(p) allyl methacrylate;
(q) N-vinyl carbazole;
(r) mixtures of the above.

EXAMPLE 19

Example 18 is modified by heating the dried flexible solid alkali metal silicate to above the boiling temperature of water. It slowly expands to produce a rigid fine cellular sodium silicated glass foam.

Although specific conditions and ingredients have been described in conjunction with the above examples of preferred embodiments, these may be varied and other reagents and additives may be used, where suitable, as described above with similar results.

Other modifications and applications of this invention will occur to those skilled in the art upon reading this disclosure. These are intended to be included within the scope of this invention as defined in the appended claims.

I claim:

1. A flexible sodium silicate glass produced by the following steps:
    (a) mixing 10 to 80 parts by weight of sodium silicate glass having a SiO$_2$:alkali metal oxide ratio of 3.9:1 to 2.0:1 with 50 to 100 parts by weight of water until an aqueous alkali metal glass suspension is produced;
    (b) pouring or applying the aqueous alkali metal silicate glass suspension into the desired form;
    (c) drying out water from the sodium silicate glass suspension.

2. The flexible alkali metal silicate glass of claim 1 wherein up to 300 percent by weight of inert filler material, based on the weight of the aqueous alkali metal silicate glass suspension, is added to the aqueous alkali metal silicate glass suspension.

3. The flexible alkali metal silicate glass of claim 1 wherein up to 300 percent by weight of a modifying compound, based on the weight of the aqueous alkali metal silicate glass suspension, is added to the aqueous alkali metal silicate glass suspension.

4. The product of claim 1 wherein up to 100 percent by weight of an oxidated silicon compound selected from the group consisting of silicic acid, polysilicic acid, hydrated silica, precipitated silica, microcrystalline silica, colloidal silica and mixtures thereof, based on weight of sodium silicate glass suspension, is added to the aqueous sodium silicate glass suspension.

5. The product of claim 1 wherein up to 30% by weight of sodium silicate solution, based on the weight of the aqueous sodium silicate glass suspension, having a SiO$_2$:alkali metal oxide ratio of 2.0:1 to 3.75:1 and containing 10 to 50 percent by weight of sodium silicate, is added to the aqueous sodium silicate suspension, then drying the water from the mixture, thereby producing flexible solid sodium silicate glass product.

6. The product of claim 1 wherein the flexible sodium silicate glass product is placed in an atmosphere of carbon dioxide.

7. A flexible sodium silicate glass produced by the following steps:
    (a) mixing for up to 30 minutes 10 to 80 parts by weight of sodium silicate glass having an SiO$_2$:alkali metal oxide ratio of 3.2:1 to 2.0:1, with 50 to 100 parts by weight of boiling water, while avoiding breaking down all the large sodium silicate particles or molecules into smaller water soluble molecules, until an aqueous sodium silicate glass suspension is produced;
    (b) pouring or applying the aqueous sodium silicate glass suspension into the desired form;
    (c) drying out water from the sodium silicate glass suspension at a temperature below the boiling point of water.

8. The product of claim 1 wherein the breaking down of all the large sodium silicate particles or molecules into smaller water soluble molecules is avoided.

* * * * *